United States Patent
Krishnamurthy et al.

(10) Patent No.: US 7,360,947 B2
(45) Date of Patent: Apr. 22, 2008

(54) TEMPERATURE SENSOR APPARATUS

(75) Inventors: Guruprasad Krishnamurthy, Bangalore (IN); Ramesh Anllkumar, Bangalore (IN); Derek Law, South Lanarkshire (GB)

(73) Assignee: Honeywell International Inc., Morristown, NJ (US)

( * ) Notice: Subject to any disclaimer, the term of this patent is extended or adjusted under 35 U.S.C. 154(b) by 99 days.

(21) Appl. No.: 11/358,964

(22) Filed: Feb. 22, 2006

(65) Prior Publication Data

US 2007/0195859 A1    Aug. 23, 2007

(51) Int. Cl.
*G01K 1/08* (2006.01)

(52) U.S. Cl. ....................... 374/208; 374/163

(58) Field of Classification Search ............... 374/208, 374/163, 183, 185
See application file for complete search history.

(56) References Cited

U.S. PATENT DOCUMENTS

| | | | | |
|---|---|---|---|---|
| 3,054,981 | A * | 9/1962 | Malek et al. | 439/585 |
| 4,461,084 | A * | 7/1984 | Slocum | 33/826 |
| 4,510,343 | A * | 4/1985 | Sivyer | 136/242 |
| 4,934,831 | A * | 6/1990 | Volbrecht | 374/183 |
| 5,047,594 | A * | 9/1991 | Powell | 174/88 R |
| 5,106,203 | A | 4/1992 | Napoli et al. | 374/144 |
| 5,181,007 | A | 1/1993 | Friese et al. | 338/22 R |
| 5,295,864 | A * | 3/1994 | Birch et al. | 439/578 |
| 5,571,992 | A * | 11/1996 | Maleski et al. | 174/36 |
| 5,726,624 | A | 3/1998 | Caffee et al. | 338/28 |
| 5,999,081 | A * | 12/1999 | Hannigan et al. | 338/28 |
| 6,331,123 | B1 | 12/2001 | Rodrigues | |
| 6,639,505 | B2 * | 10/2003 | Murata et al. | 338/25 |
| 6,698,922 | B2 * | 3/2004 | Adachi et al. | 374/208 |
| 6,880,969 | B2 | 4/2005 | Adachi et al. | 374/185 |
| 6,899,457 | B2 | 5/2005 | Kurano | 374/185 |
| 7,004,626 | B1 * | 2/2006 | Giberson et al. | 374/179 |
| 7,064,266 | B2 * | 6/2006 | Wada | 174/359 |
| 2003/0121782 | A1 * | 7/2003 | Atsumi et al. | 204/424 |
| 2005/0150679 | A1 * | 7/2005 | Grogl et al. | 174/120 R |
| 2006/0013282 | A1 * | 1/2006 | Hanzawa et al. | 374/163 |

FOREIGN PATENT DOCUMENTS

| | | |
|---|---|---|
| DE | 3721983 A1 | 1/1989 |
| EP | 0424120 A2 | 4/1991 |
| EP | 1503462 A1 | 2/2005 |
| WO | WO 2005/075949 A1 | 8/2005 |

* cited by examiner

*Primary Examiner*—Gail Verbitsky
(74) *Attorney, Agent, or Firm*—Kermit D. Lopez; Luis M. Ortiz

(57) ABSTRACT

An apparatus for temperature sensing is disclosed that includes a sensor tube and a cable assembly connected to and extending from said sensor tube wherein said cable assembly communicates electrically with the sensor tube for temperature sensing operations thereof. An O-ring component can be selected based on an inner diameter of said sensor tube and an outer diameter of said cable assembly, wherein said o-ring component is crimped in order to seal and protect said sensor tube from de-alignment and misplacement and located co-axial to said sensor tube and said cable assembly, thereby providing an enhanced mechanical strength and prevention against leakage or ingress of moisture from or to said sensor tube.

19 Claims, 2 Drawing Sheets

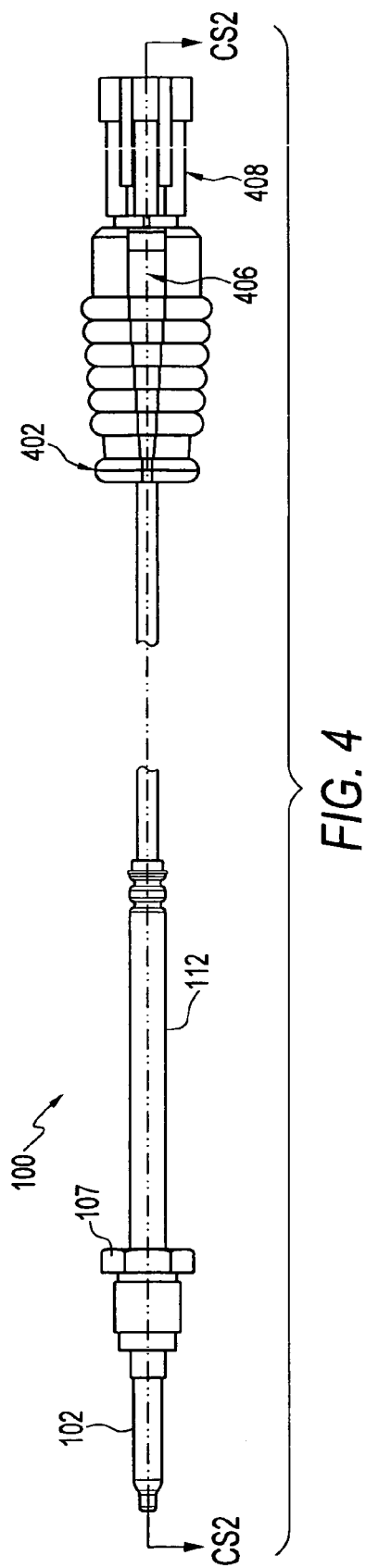
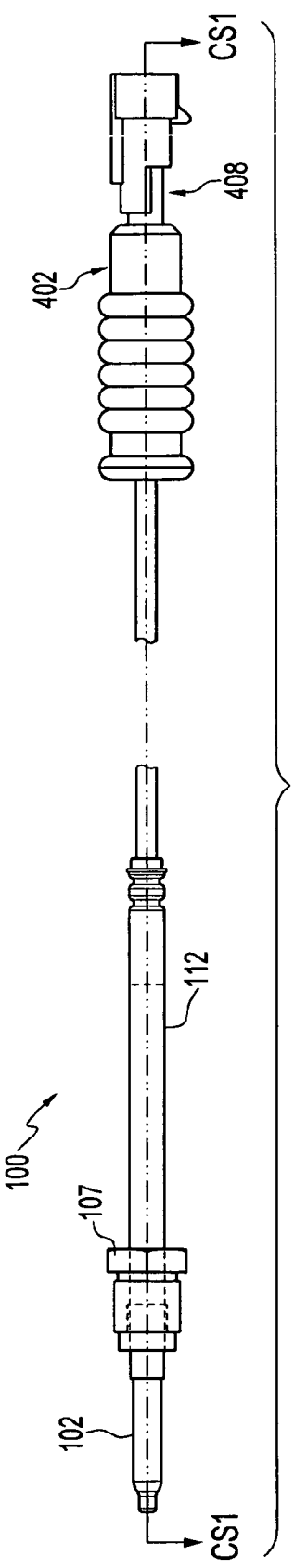

TEMPERATURE SENSOR APPARATUS

TECHNICAL FIELD

Embodiments are generally related to sensor devices and embodiments are also related to temperature sensors. Embodiments are additionally related to temperature sensors utilized in harsh and corrosive environments, such as automotive applications.

BACKGROUND

Temperature sensors are utilized in a variety of applications. For example, temperature sensors that are used in conjunction with ovens typically comprise a metallic tube in which a temperature sensitive element is disposed inside one end with conductive wires extending within the tube from the temperature sensitive element to an opening at the other end of the tube. The metallic tube is inserted through a wall of the oven to permit the temperature sensitive element to be placed in thermal communication with the internal cavity of the oven. The temperature sensitive element is typically a resistive temperature detector, or RTD. The temperature sensor can be also based on a thermistor or thermocouple configuration, a metal oxide semiconductor, or any other type of temperature sensing element.

One area where temperature sensors find particular usefulness is in the area of exhaust gas environments. Various applications require measurement of temperature of gas or mixture of gases at elevated temperatures. One such application involves automotive or combustion applications in which a need exists for measuring the exhaust gas temperature for emission control using Selective catalytic reduction (SCR) and Exhaust Gas Recirculation (EGR) based emission after treatment systems. The sensor should function in a harsh and corrosive automotive exhaust gas environment containing, for example, soot particles, $SO_x$, moisture, diesel, $NH_3$, $NO_x$, HC, CO, $CO_2$ etc.

Exhaust gas temperature (EGT) can be utilized to measure the performance, for example, of an automotive engine. The exhaust gas temperature also provides an indication of the rate of deterioration of automotive engine components. Thus, since the exhaust gas temperature is an indicator of engine status, it may be used to measure and control operational and functional characteristics of the engine.

Accurate measurement of the exhaust gas temperature level is important. To accurately measure exhaust gas temperatures, it is necessary to minimize degradation of the EGT measurement system. Thus it is desirable that the EGT measurement system compensate for engine to engine variations and combustor exit temperature profiles. In addition, the measurement system should compensate for shifts in engine profiles that may occur with progressive deterioration of the engine components.

The penetration of a particular sensor can be determined by the temperature profile of the exhaust gases. The exhaust gas temperature profile is determined by the number, type and arrangement of the combustion nozzles in the combustor. The exhaust gas temperature profile for a particular engine may be determined by using a large number of thermocouple elements arranged in a number of sensors around the exhaust passage and at various penetration depths. Once the exhaust gas temperature profile is defined for a particular type of engine, it may be used to calculate the number and arrangement of EGT sensors necessary to monitor the exhaust gas temperature during normal engine operation.

As indicated above, a variety of temperature sensing elements can be utilized in the context of an exhaust gas temperature sensor. Resistance Temperature detectors (RTD) elements can be used in temperature measuring equipment. The RTD Element has a ceramic substrate with a platinum or nickel or similar metal thin/thick film resistor with an over coating of a protective layer like glass or ceramic or any other material glazing, which is thermally a good conductor. Wire wound RTD elements are also available. Materials such as, for example, platinum or nickel have a positive co-efficient of temperature and the resistance increases linearly with increase in temperature.

Thermistors are also utilized in temperature measuring equipment. Thermistors are essentially semiconductor devices, which behave as thermal resistors having high negative or positive temperature co-efficient of resistance. Thermistors are made of sintered metal oxide ceramics like oxides of iron, magnesium, nickel, cobalt and copper in the form of beads or discs or rods. The variation in temperature is non linear, resistance decreases with increase in temperature in case of negative temperature co-efficient (NTC) of resistance thermistor and resistance increases with increase in temperature in case of positive temperature co-efficient (PTC) of resistance thermistor.

Thermocouples are the most commonly utilized temperature sensing devices and operate based on the principle of the so-called See-Beck effect, i.e., when two dissimilar metal or ceramic or metal oxide semiconductor junctions are maintained at different temperature an EMF is induced at the junction, which is proportional to temperature difference. Generally Platinum with copper, Constantan, Nickel, Rhodium, Iron, Gold, $ZrO_2$, $Al_2O_3$, $CeO_2$ and so forth can be utilized. The sensing element can be suitably packaged and placed in a gas flow path and the temperature is measured by using a suitable electronic circuit by transduction of resistance or voltage.

Temperature sensors can be configured to include a housing formed from a material, such as, for example, stainless steel, inconel, brass, and so forth. A connecting cable may typically connect to sensor at an interface junction. The junction or interface of the cable and metal tube is generally crimped to hold the cable mechanically. In harsh environments, however, such as automotive applications, there exists a high demand for water and dust proof sealing and often the crimping of such sensors fails to withstand the ingress of water and moisture and corrosive gases and liquids, while being susceptible to leakage. There thus exists a continuing need for temperature sensors that are water proof and leak proof, while also suitable for harsh and long exposure to corrosive environments, such as, for example, an automobile exhaust gas environment.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for an improved temperature sensor.

It is yet another aspect of the present invention to provide for an improved exhaust gas temperature sensor.

The aforementioned aspects of the invention and other objectives and advantages can now be achieved as described herein. An apparatus for temperature sensing is disclosed that includes a sensor tube and a cable assembly connected to and extending from said sensor tube wherein said cable assembly communicates electrically with the sensor tube for temperature sensing operations thereof. An O-ring component can be selected based on an inner diameter of said sensor tube and an outer diameter of said cable assembly, wherein said o-ring component is crimped in order to seal and protect said sensor tube from de-alignment and misplacement and located co-axial to said sensor tube and said cable assembly, thereby providing an enhanced mechanical strength and prevention against leakage or ingress of moisture from or to said sensor tube.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

FIG. 4 illustrates an external view of the temperature sensing apparatus depicted in FIGS. 1-3, in accordance with a preferred embodiment; and FIG. 5 illustrates another view of the temperature sensing apparatus depicted in FIGS. 1-4, in accordance with a preferred embodiment.

DETAILED DESCRIPTION

The particular values and configurations discussed in these non-limiting examples can be varied and are cited merely to illustrate at least one embodiment and are not intended to limit the scope of the invention.

Figure 1:
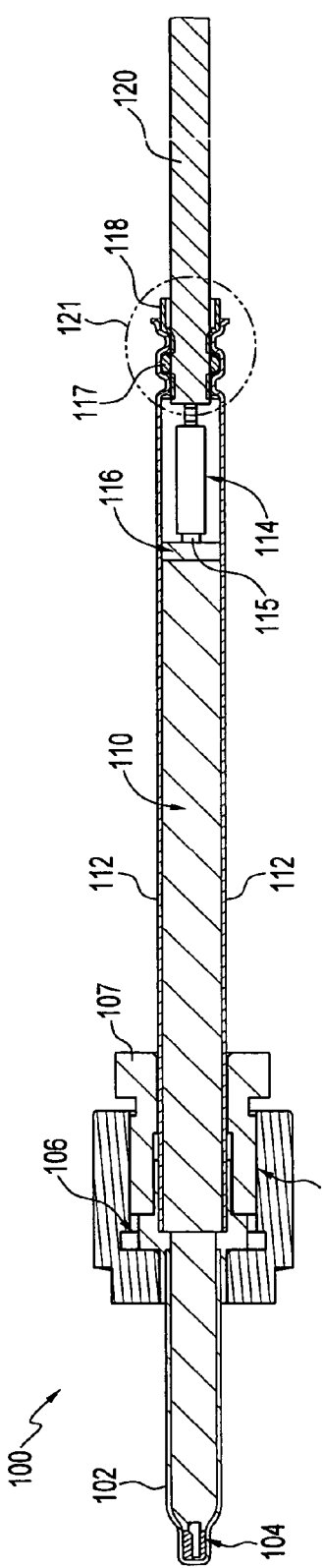
FIG. 1 illustrates a temperature sensing apparatus, which can be implemented in accordance with a preferred embodiment.

FIG. 1 illustrates a temperature sensing apparatus 100, which can be implemented in accordance with a preferred embodiment. The illustration depicted in FIG. 1 is based on a CS2-CS2 sectional view. The apparatus 100 generally includes a sensor tube 102 that includes a tip 104 that can be formed from a potting compound, such as, for example, SiC. A collar fitting 106 can be integrated with or connected to the sensor tube 102 of apparatus 100 and can be further associated with a fixing nut 108 located about sensor tube 102. The collar fitting 106 is generally integrated with a collar component 107. The apparatus 100 further incorporates an extension tube 112 that is associated with or integrated with sensor tube 102, depending upon design considerations. Note that the extension tube 112 can be formed from a nickel-based superalloy, such as, for example, Inconel®, which is a trademark of the Special Metal Corporation.

In general, Inconel® is a family of nickel-based superalloys. Inconel alloy 600 is 72% nickel, 16% chromium, and 8% iron. Other forms of Inconel® exist, each with slightly different additions (e.g. Inconel® alloy 750 has a small percentage of titanium and aluminum added for hardenability). Inconel® is highly oxidation and corrosion resistant, even at very high temperatures, and retains a high mechanical strength under these conditions as well. Thus, it is often used in extreme conditions, such as aircraft engine parts, turbocharger turbine wheels, chemical processing and pressure vessels. Other versions of Inconel® resist acid and other aggressive conditions such as Ni-20Cr-16Mo-4W Inconel® alloy 686.

The extension tube 112 can thus form a part of the sensor tube 102 or may form a separate component connected to and associated with the sensor tube 102. The extension tube 112 can be formed from a material, such as, for example, ceramic. The walls 110 of the extension tube 112 can thus be formed from a material such as ceramic. A seal compound 116 can also be provided adjacent a component 115, which in turn is surrounded by a jacket or sleeve 114 that can be formed from a material such as, for example, fiber glass. An O-ring component 117 can also be provided as a part of apparatus 100, which covers a portion of a jacket or sleeve 118 that functions as an insulated sleeve with a metal braiding (e.g., see crimped locations 203, 205 in FIG. 2).

The insulated sleeve 118 can be formed from a material, such as, for example, a fluorinated polymer. One example of such a fluorinated polymer is Teflon®. Note that Teflon® is a registered trademark of the "E.I. Du Pont de Nemours & Company Corporation" of Wilmington, Del. The insulated sleeve 118 can also be from silicon rubber or a fluroestalstomer, depending upon design consideration. A section 121 of the apparatus 100 is generally indicated in FIG. 1 by dashed lines.

A cable assembly 120 can also be connected to and extend from the sensor tube 102 via the extension tube 112. The cable assembly 120 can thus communicate electrically with the temperature sensor component (not shown) maintained by the sensor tube 102. The O-ring component 117 can be selected based on an inner diameter of said sensor tube 102 and an outer diameter of the cable assembly 120. The O-ring component 117 is generally crimped in order to seal and protect said sensor tube 102 from de-alignment and misplacement and located co-axial to said sensor tube 102 and the cable assembly 120, thereby providing an enhanced mechanical strength and prevention against leakage or ingress of moisture from or to said sensor tube 102 and resulting temperature sensing apparatus 100.

Figure 2:
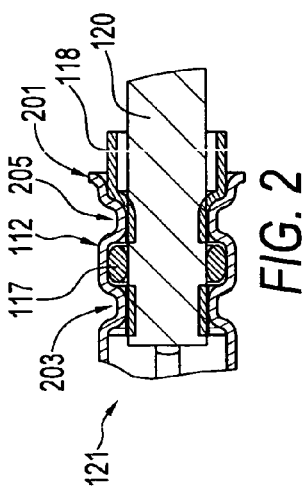
FIG. 2 illustrates a detailed view of a section of the apparatus depicted in FIG. 1, in accordance with a preferred embodiment.

FIG. 2 illustrates a detailed view of the section 121 of apparatus 100 depicted in FIG. 1, in accordance with a preferred embodiment. Note that in FIGS. 1-5, identical or similar parts or elements are generally indicated by identical reference numerals. FIG. 2 presents a detailed CS2-CS2 sectional view of the apparatus 100 depicted in FIG. 1. As shown in FIG. 2, the cable assembly is generally surrounded by the insulated sleeve 118, which in turn is located in place within the tube 112. Note that the tube 112 includes an end portion 201 thereof that is flared. The O-ring component 117 is also depicted in section 121 depicted in FIG. 2, wherein the O-ring component 117 is also embedded within the bounds of the tube 112. Note that a circular double crimp can also be implemented at crimped locations 203, 205 depicted in FIG. 2. Note that the crimp dimensions should preferably be maintained as close as possible to the required dimensions of the O-ring component 117.

Figure 3:
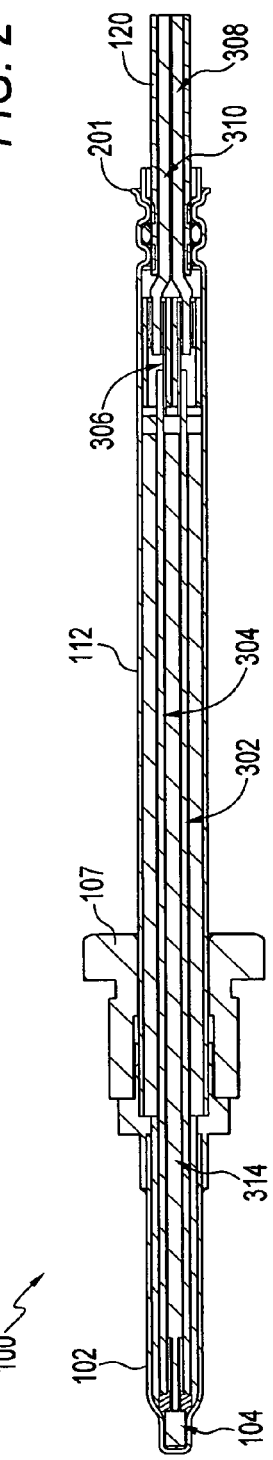
FIG. 3 illustrates a detailed view of the temperature sensing apparatus depicted in FIGS. 1-2, in accordance with a preferred embodiment.

FIG. 3 illustrates a detailed view of the temperature sensing apparatus 100 depicted in FIGS. 1-2, in accordance with a preferred embodiment Again, identical or similar parts or elements are generally depicted in FIGS. 1-5. Thus, FIG. 3 shows components in addition to those depicted in FIGS. 1-2. For example, a ceramic tube 314 is depicted in FIG. 3 in addition to two wires 302, 304, which are located within the extension tube 112. Note that the two wires 302, 304 can be formed from a material such as Inconel®, depending of course on design consideration and goals. The ceramic tube 314 is located generally within sensor tube 102. Contact terminals 306 are also provided as a part of the apparatus 100 and can communicate electrically with the wires 302, 304. Primary wires 308 and 310 are also indicated in FIG. 3 and form a part of the cable assembly 120.

FIG. 4 illustrates an external view of the temperature sensing apparatus 100 depicted in FIGS. 1-3, in accordance with a preferred embodiment. FIG. 5 illustrates another view of the temperature sensing apparatus 100 depicted in FIGS. 1-4, in accordance with a preferred embodiment. Note that FIG. 4 illustrates a view along CS2, while FIG. 5 represents a view along CS1. As indicated in FIG. 4, a rear tube crimped connector 402 can be provided along with a heat shrink sleeve 406. A tab housing 408 is also depicted in FIGS. 4-5.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus for temperature sensing, comprising:
a sensor tube and an extension tube connected to said sensor tube;
a cable assembly and an insulated sleeve, said cable assembly surrounded by said insulated sleeve, which in turn is located within said extension tube, said cable assembly connected to and extending from said sensor tube via said extension tube, wherein said cable assembly communicates electrically with said sensor tube for sensing operations thereof; and
an O-ring component embedded within the bounds of said extension tube, wherein said O-ring component is selected for use with said cable assembly and said sensor tube based on an inner diameter of said sensor tube and an outer diameter of said cable assembly, wherein said O-ring component comprises a crimped section that seals and protects said sensor tube from de-alignment and misplacement and which is located co-axial to said sensor tube and said cable assembly, thereby providing an enhanced mechanical strength and prevention against leakage or ingress of moisture from or to said sensor tube.

2. The apparatus of claim 1, wherein said cable assembly comprises said insulated sleeve, said insulated sleeve including with a metal braiding thereof, wherein said insulated sleeve comprises a fluorinated polymer.

3. The apparatus of claim 1, wherein said cable assembly comprises said insulated sleeve, said insulated sleeve having a metal braiding thereof, wherein said insulated sleeve comprises silicon rubber.

4. The apparatus of claim 1, wherein said cable assembly comprises said insulated sleeve, said insulated sleeve having a metal braiding thereof, wherein said insulated sleeve comprises a fluroestalstomer.

5. The apparatus of claim 1, wherein said O-ring component comprises silicon rubber.

6. An apparatus for temperature sensing, comprising:
a sensor tube and an extension tube connected to said sensor tube;
an insulated sleeve and a cable assembly, said cable assembly connected to and extending from said sensor tube via said extension tube, said cable assembly surrounded by said insulated sleeve which is located within said extension tube, wherein said cable assembly communicates electrically with said sensor tube for sensing operations thereof; and
an O-ring component embedded within the bounds of said extension tube, wherein said O-ring component is selected for use with said cable assembly and said sensor tube based on an inner diameter of said sensor tube and an outer diameter of said cable assembly, wherein said O-ring component comprises a circular double crimped section that seals and protects said sensor tube from de-alignment and misplacement and which is located co-axial to said sensor tube and said cable assembly, thereby providing an enhanced mechanical strength and prevention against leakage or ingress of moisture from or to said sensor tube.

7. The apparatus of claim 6 wherein said cable assembly comprises said insulated sleeve with a metal braiding thereof, wherein said insulated sleeve comprises a fluorinated polymer.

8. The apparatus of claim 6, wherein said cable assembly comprises said insulated sleeve with a metal braiding thereof, wherein said insulated sleeve comprises silicon rubber.

9. The apparatus of claim 6, wherein said cable assembly comprises said insulated sleeve with a metal braiding thereof, wherein said insulated sleeve comprises a fluroestalstomer.

10. The apparatus of claim 6, wherein said O-ring component comprises silicon rubber.

11. An apparatus for temperature sensing, comprising:
a sensor tube and an extension tube connected to said sensor tube;
an insulated sleeve and a cable assembly, said cable assembly connected to and extending from said sensor tube via said extension tube wherein said cable assembly communicates electrically with said sensor tube for sensing operations thereof and wherein said insulated sleeve is located within said extension tube; and
an O-ring component embedded within the bounds of said extension tube, wherein said O-ring component is selected based on an inner diameter of said sensor tube and an outer diameter of said cable assembly, said O-ring component including a is crimped section that seals and protects said sensor tube from de-alignment and misplacement and which is located co-axial to said sensor tube and said cable assembly, thereby providing an enhanced mechanical strength and prevention against leakage or ingress of moisture from or to said sensor tube, wherein said cable assembly comprises an insulated sleeve with a metal braiding thereof and said insulated sleeve comprises a fluorinated polymer.

12. The apparatus of claim 11, wherein said cable assembly comprises said insulated sleeve with a metal braiding thereof, wherein said insulated sleeve comprises silicon rubber.

13. The apparatus of claim 11, wherein said cable assembly comprises said insulated sleeve with a metal braiding thereof, wherein said insulated sleeve comprises a fluroestalstomer.

14. The apparatus of claim 11, wherein said O-ring component comprises silicon rubber.

15. A method for temperature sensing, comprising:
providing a sensor tube;
attaching an extension tube to said sensor tube;
connecting a cable assembly to and extending from said sensor tube via said extension tube, wherein said cable assembly communicates electrically with said sensor tube for sensing operations thereof;
surrounding said cable assembly with an insulated sleeve, which in turn is located in Place within said extension tube; and
embedding an O-ring component within the bounds of said extension tube, wherein said O-ring component is selected for use with said cable assembly and said sensor tube based on an inner diameter of said sensor tube and an outer diameter of said cable assembly, wherein said O-ring component is crimped in order to seal and protect said sensor tube from de-alignment and misplacement and located co-axial to said sensor tube and said cable assembly, thereby providing an enhanced mechanical strength and prevention against leakage or ingress of moisture from or to said sensor tube.

16. The method of claim 15, wherein said cable assembly comprises said insulated sleeve with a metal braiding thereof, wherein said insulated sleeve comprises a fluorinated polymer.

17. The method of claim 15, wherein said cable assembly comprises said insulated sleeve with a metal braiding thereof.

18. The method of claim 15, wherein said insulated sleeve comprises silicon rubber.

19. The method of claim 15, wherein said cable assembly comprises said insulated sleeve with a metal braiding thereof, wherein said insulated sleeve comprises a fluroestalstomer.

* * * * *